US006692260B2

(12) United States Patent
Beck et al.

(10) Patent No.: US 6,692,260 B2
(45) Date of Patent: Feb. 17, 2004

(54) BUSINESS METHOD AND DEVICE FOR MARKETING AUTOMOBILE FLUID REPLACEMENT SERVICES

(75) Inventors: Michael Beck, North Palm Beach, FL (US); Charles Polston, Tulsa, OK (US); Sandor Cenziper, Boca Raton, FL (US); Robert Moore, West Palm Beach, FL (US); John Thompson, Oklahoma City, OK (US)

(73) Assignee: B G Products, Inc., Wichita, KS (US)

( * ) Notice: Subject to any disclaimer, the term of this patent is extended or adjusted under 35 U.S.C. 154(b) by 242 days.

(21) Appl. No.: 09/770,821

(22) Filed: Jan. 26, 2001

(65) Prior Publication Data

US 2002/0102527 A1 Aug. 1, 2002

(51) Int. Cl.[7] .............................................. G09B 25/00
(52) U.S. Cl. ...................................... 434/374; 434/373
(58) Field of Search ................................ 434/373, 374; 184/1.5, 106; 141/323

(56) References Cited

U.S. PATENT DOCUMENTS

| | | | | |
|---|---|---|---|---|
| 4,095,673 A | * | 6/1978 | Takeuchi | 184/1.5 |
| 4,807,674 A | * | 2/1989 | Sweet | 141/59 |
| 5,415,247 A | * | 5/1995 | Knorr | 184/1.5 |
| 5,626,170 A | * | 5/1997 | Parker | 141/98 |
| 5,706,873 A | * | 1/1998 | Benoit | 141/98 |
| 5,915,499 A | * | 6/1999 | Few | 184/1.5 |
| RE36,650 E | * | 4/2000 | Viken | 184/1.5 |
| 6,170,505 B1 | * | 1/2001 | Erwin | 137/1 |

OTHER PUBLICATIONS

OilMedic Sapling Methods webpage, Sep. 2000.*

* cited by examiner

Primary Examiner—Jacob K. Ackun
Assistant Examiner—Kurt Fernstrom
(74) Attorney, Agent, or Firm—Shook, Hardy & Bacon L.L.P.

(57) ABSTRACT

A method and sampling system are provided for sampling and marketing fluid replacement services. Once an automobile arrives at the service facility, the automobile service technician quickly obtains fluid samples from the various systems of an automobile. While the consumer provides relevant information relating to the vehicle to a customer service technician, the automobile service technician places the fluid samples into receptacles allowing the consumer to visually inspect the condition of each fluid. The service technician then provides new fluids in proximity to the actual fluids of the engine to allow a side-by-side comparison of the visual condition of the fluids. The samples are then presented to the consumer while the consumer is in contact with the customer service technician to allow the consumer to make a determination as to whether the fluids must be replaced.

5 Claims, 2 Drawing Sheets

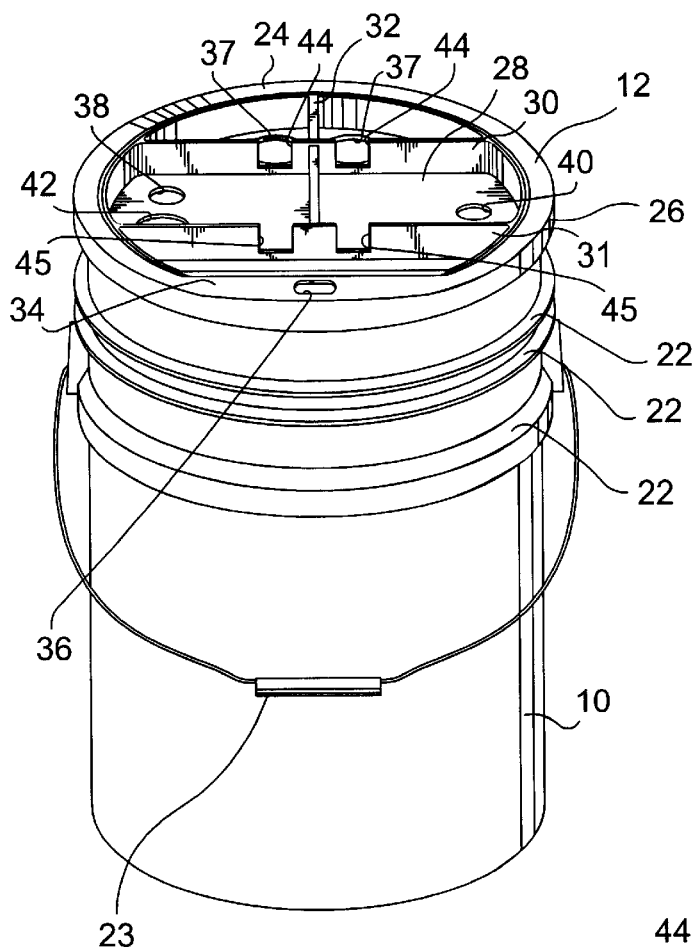
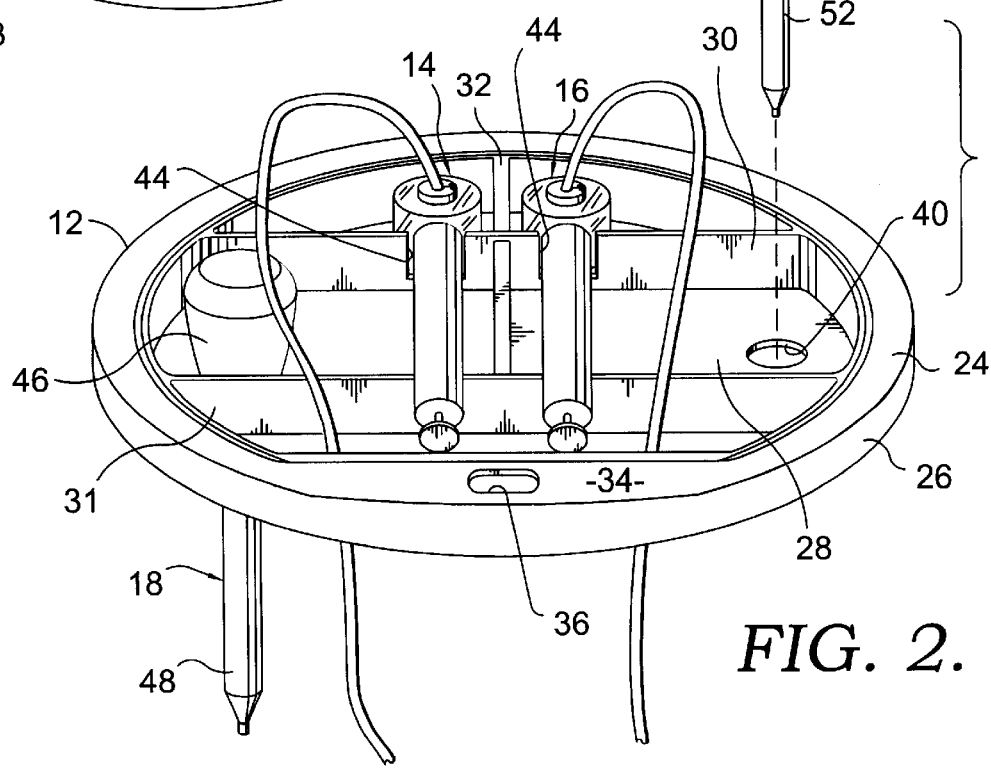
FIG. 1.
FIG. 2.

BUSINESS METHOD AND DEVICE FOR MARKETING AUTOMOBILE FLUID REPLACEMENT SERVICES

CROSS-REFERENCE TO RELATED APPLICATIONS

"Not Applicable"

STATEMENT REGARDING FEDERALLY SPONSORED RESEARCH AND DEVELOPMENT

"Not Applicable"

BACKGROUND OF THE INVENTION

This invention relates to the field of automobile repair services and, more particularly, to a method and a device for sampling automobile fluids and increasing consumer awareness as to the need for fluid replacement services.

The automobile service industry is a significant component of our domestic economy. Virtually every consumer who owns and drives a vehicle requires the assistance of an automobile service technician to repair their vehicle or to service the vehicle to ensure its long term operation.

One of the most significant components of ensuring long term performance of a vehicle is to maintain clean and properly functioning fluids within the various systems of the automobile. Automobiles require fluids for a variety of purposes such as to maintain low friction environments within certain systems, to cool engine components and to allow hydraulic action. For instance, motor oil is used to lubricate the combustion components of the vehicle. Also, a coolant is circulated through the components of the engine to maintain a low temperature. Other important fluids such as power steering fluid, transmission fluid and transmission differential fluid are used in other systems of the automobile.

Each fluid must be regularly inspected to determine if the inherent qualities of the fluid have been compromised as a result of the heat and frictional environment in which the fluid operates. If the fluid shows signs of contamination or degradation, the fluid must be replaced. Failure to replace fluids at appropriate times can result in significant damage to the particular system of the vehicle, and result in the inability of the vehicle to function properly.

In the past, when a consumer would take his or her vehicle to a repair shop or dealership for maintenance, the acute problems with the vehicle were addressed. However, the service technicians oftentimes did not make the consumer fully aware of preventive maintenance that was needed to ensure the long term condition of the vehicle. Specifically, the consumer was not educated as to the condition of the fluids that are vital to the long term operation of the vehicle. In large part, this deficiency was due to the difficulties associated with determining when the automobile fluids require replacement. Most automobile manufacturers provide mileage guidelines at which certain fluids should be replaced. However, these guidelines do not account for the actual condition of the fluid at issue. The actual condition may vary based on driving habits, weather conditions, the quality of the fluid and a number of other factors. Consequently, it is oftentimes necessary to determine if the individual fluids need replacement prior to the mileages suggested by the guidelines.

The actual condition of many automobile fluids may be made by visual inspection. However, it is difficult to make this inspection since many of the component fluids of the automobile are not readily visible for inspection. Particularly, several fluids in the engine are circulated deep within the internal components of the engine. Certain engine components have dipsticks (or rods) that extend into the fluid reservoir within the engine and can be withdrawn to ascertain the fluid level. However, dipsticks are inherently inaccurate, and do not allow for an adequate visual inspection of the color and consistency of the fluid since only a small volume of fluid adheres to the dipstick. Other fluids are completely inaccessible without specialized sampling equipment.

In the end, a great deal of preventive maintenance is left unperformed because the consumer is not made aware of the deficiencies when the automobile is otherwise being serviced. In many cases, the consumer suffers because of this lack of awareness. Also, the dealerships and repair shops that typically focus on one time repairs do not perform the preventive maintenance work that is both necessary and profitable in relation to repair services.

BRIEF SUMMARY OF THE INVENTION

It is an object of the present invention to provide a method by which automobile service technicians can quickly and inexpensively ascertain the condition of the various automobile fluids.

It is also an object of the present invention to provide a method by which automobile service technicians can readily sample and display automobile fluids to illustrate to a consumer the condition of the various fluids and the need for the replacement of one or more of the fluids.

It is also an object of the present invention to provide a method for providing information to a consumer concerning the condition of their automobile fluids to allow the consumer to determine whether the fluids in their vehicle should be changed.

It is another object of the invention to provide a device capable of extracting sufficient volumes of automobile fluids to allow for visual inspection of the fluids.

Yet another object of the invention is to provide a device wherein the fluids extracted from the automobile do not require transfer from a container to the display device.

It is another object of the invention to provide a unitary device capable of extracting a wide array of automobile fluids and storing waste fluids.

In accordance with these and other objects evident from the following description of a preferred embodiment of the invention, a method is provided for sampling and marketing fluid replacement services. Once an automobile arrives at the service facility, the automobile service technician quickly obtains fluid samples from the various systems of an automobile. While the consumer provides relevant information relating to the vehicle to a customer service technician, the automobile service technician places the fluid samples into receptacles allowing the consumer to visually inspect the condition of each fluid. The service technician then provides new fluids in proximity to the actual fluids of the engine to allow a side-by-side comparison of the visual condition of the fluids. The samples are then presented to the consumer while the consumer is in contact with the customer service technician to allow the consumer to make a determination as to whether the fluids must be replaced.

In another aspect of the invention, a sampling system is provided for sampling automobile fluids in accordance with the method. The sampling system includes a receptacle having a lid for retaining each of the tools needed to take samples from the automobiles. At least one pump having an elongated tube for placement within a dipstick access hole is used to draw fluid from a fluid reservoir. As the pump is extended, fluid is pulled into a sampling tube releasably secured to the pump. A number of syringes are used to sample those automotive fluids that are not accessible by a dipstick access hole.

BRIEF DESCRIPTION OF THE DRAWINGS

The preferred embodiment of the present invention are described in detail below with reference to the attached drawings, wherein:

FIG. 1 is a perspective view of the bucket and lid of the sampling device of the present invention, taken from above, with the tools removed to illustrate the construction of the lid;

FIG. 2 is a perspective view of the lid and tools of the present invention, taken from above, with the small syringe shown in an exploded manner;

DETAILED DESCRIPTION OF THE INVENTION

Figure 3:
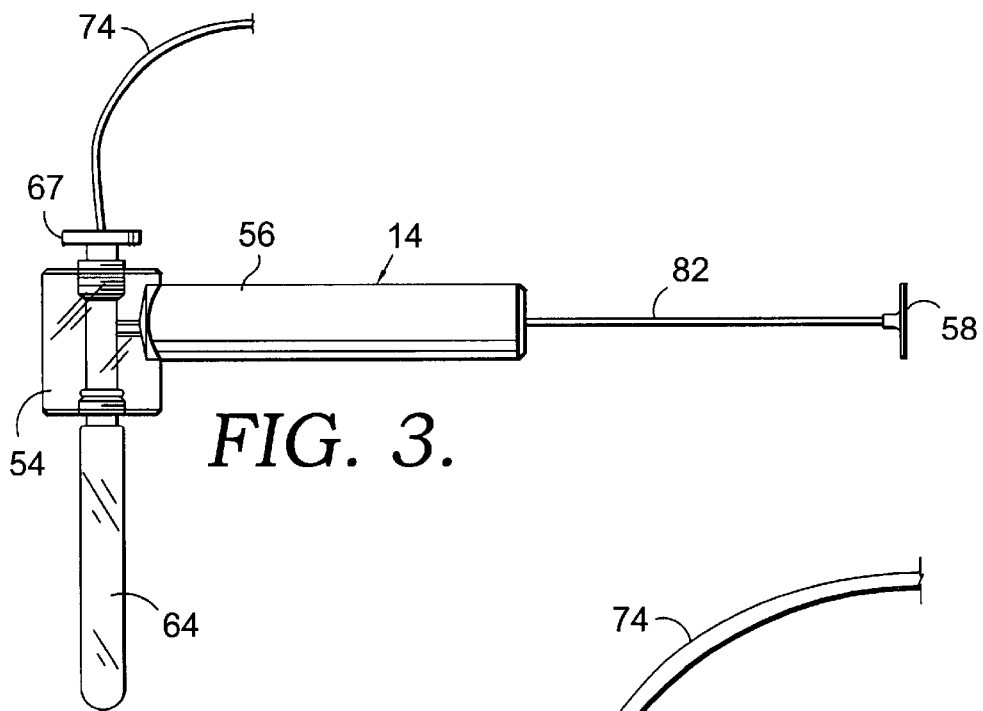
FIG. 3 is a side elevational view of a pump of the sampling device illustrating the handle in an extended position.

As shown in FIG. 1, a bucket 10 and a lid 12 constructed in accordance with the preferred embodiment of the present invention are shown. With reference to FIG. 2, the tools of the sampling device are shown in conjunction with the lid 12, and include a pair of pumps 14 and 16, a large syringe 18 and a small syringe 20.

The bucket 10 as shown in FIG. 1 is preferably a conventional 5-gallon bucket made of a rigid plastic material. A number of annular ribs 22 are formed about the bucket and a handle 23 is rotatable about either side of the bucket. The lid 12 is frictionally and removably secured onto the bucket. With reference to FIGS. 1 and 2, the lid is of the tool box type and includes an outer periphery 24 having a skirt 26 overlying the rim of the bucket opening. Within the outer periphery 24, the lid has an inset floor 28 divided into compartments by a pair of parallel ribs 30 and 31 extending from one side of the outer periphery 24 to the other. A third rib 32 extends from another side of the periphery, perpendicularly across the first rib 30 and terminates at the second rib 31. On the side of the lid opposite the intersection of rib 32 and the outer periphery, a ledge 34 is defined that is angled upwardly with respect to the upper surface of the outer periphery 24. An opening 36 is defined in ledge 34 to facilitate removal of the lid from the bucket. Namely, a user may place his or her thumb into the opening 36 and pull the lid from the bucket.

As shown in FIG. 1, a pair of small apertures 37 are located within floor 28 on opposite sides of the rib 32, and at positions between the rib 30 and the outer periphery 24. Also, a pair of small openings 38 and 40 are located in the floor 28 between the parallel ribs 30 and 31. The openings are preferably circular and have a diameter of approximately three centimeters. A larger circular opening 42 is disposed proximate opening 38, and preferably has a diameter of about four centimeters. Also, pairs of square notches 44 and 45 are located within the first and second ribs on either side of the rib 32. The notches 44 within rib 30 are spaced at the same distance from one another as the notches 45 in rib 31, and the pairs are aligned with one another.

As shown in FIG. 2, the large syringe 31 is adapted for receipt within opening 42. The syringe 18 is of conventional construction, and has a bulb 46 and a stem 48 extending therefrom. The stem has a length of about twenty to twenty-two centimeters and extends a sufficient distance to draw fluid from the cooling system of the vehicle. The bulb is preferably green to correspond with the coolant that the syringe is preferably used to extract, as described in more detail below. Opening 42 is sized to allow stem 48 to fit through the opening and to form a seat for the bulb 46 of the syringe 18. Preferably, the syringe has a 45 milliliter capacity.

Similarly, opening 40 serves as a seat for the small syringe 20. The syringe is also of conventional construction, and has a bulb 50 and a stem 52. The bulb is preferably yellow in color to indicate that power steering fluid is to be removed by the syringe. The syringe has a capacity of about 14 milliliters and the stem has a length of about 13 to 14 centimeters. Other openings and syringes may be incorporated within the sampling system without departing from the scope of the invention. The number is dictated by the number of different fluids that are to be sampled and displayed. Also, the bulbs of the syringes could be labeled or otherwise distinguished to indicate the type of fluid for which they are designed to sample.

Figure 4:
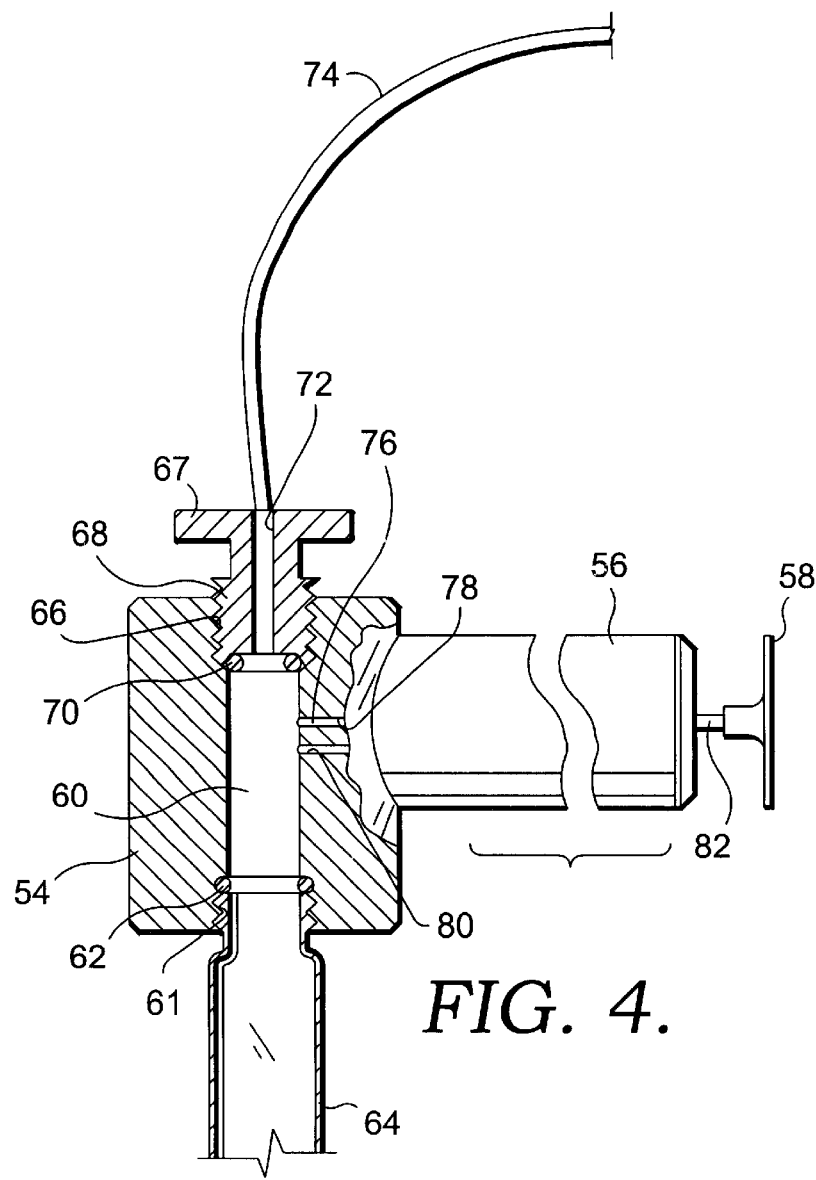
FIG. 4 is an enlarged, fragmentary view of the pump of FIG. 3 with portions in section to better illustrate the construction of the pump.

The pumps 14 and 16 are secured to the lid within the notches 44 and 45 in the opposing ribs. With reference to FIGS. 3 and 4, pump 14 is shown in greater detail. Pump 14 has a base 54, an air chamber 56 and a handle 58. As shown in FIG. 4, the base 54 has a central channel 60 extending from one end of the base to the other. At the lower end of channel 60, the base has a threaded portion 61 with an o-ring gasket 62 at the base of the threaded portion. In the preferred embodiment, the base 54 is made of an transparent acrylic material so that the fluids may be viewed during the sampling process. A test tube 64 having a threaded top 65 may be secured within the threaded portion 61 of the pump base. The leading edge of threaded top 65 contacts the o-ring gasket 62 to form a fluid tight seal.

On the opposing side of the chamber 60 within the pump base, a second threaded region 66 is defined within the base. A plug 67 having a threaded portion 68 is secured within the base against an o-ring 70 disposed at the base of the threaded region 66. The plug 67 has an inner channel 72 placing the channel 60 of the base into communication with the outside environment.

A sampling tube 74 having a diameter slightly less than that of the inner channel 72 is placed within the channel. An elastomeric sealing surface may be disposed within channel 72 to hold the tube 74 relative to the plug at one end. Preferably, the diameter of the tube is less than that of the automobile dipstick, and is typically between ⅜ and ⅝ of an inch. The opposing end of the tube is adapted for sampling fluids from an automobile. Preferably, the tube extends a distance of about five feet and terminates in a tapered end to prevent the end from being blocked by the reservoir wall within which the tube is placed. The tube extends beyond the length of the dipstick access tubes of nearly all vehicles. Also, the tube is preferably made from high temperature tubing with a melting point of more than 400 degrees Fahrenheit so that it does not melt when motor oil is transferred through the pump.

The air chamber 56 is secured to the base of the pump by a screw 76 held within a small bore 78 in the base. At a distance from bore 78, an air passageway 80 places the interior of chamber 56 in communication with the interior of the chamber 56. The handle 58 is secured to a rod 82 slidable with respect to the chamber 56. At the end of the rod opposing the handle, a plunger having a one-way valve (not shown) is disposed within the chamber. The end of the chamber opposite the pump base has at least one aperture (not shown) that allows air to escape the pump chamber as the handle is moved to the extended position.

Pump 16 is of similar construction as pump 14. However, if the pump is not used to withdraw motor oil or another particular hot fluid from the automobile, the tube does not need to have a similarly high melting point as the tube of pump 14. The pump 14 should be prominently marked so that the two pumps are used to sample the appropriate type of fluid. As shown in FIG. 2, when the pumps are placed on the lid 12, the tubes may be stored within the interior by placing the tubes through the pair of small apertures 37 in the base of the lid.

In operation, after the consumer's vehicle arrives at the service facility, the consumer exits the vehicle and is approached by a customer service technician (CST), or consumer awareness technician, who begins acquiring information from the consumer concerning his or her vehicle and the reasons for the service visit. The acquisition step preferably includes providing the customer with a survey to detail the condition of the vehicle. Specifically, the survey solicits information regarding previous maintenance of the vehicle, any observations of malfunctioning by the vehicle, and mileage readings. Additionally, the acquisition step may include accessing a computer database at the service station that stores the maintenance records of the vehicle at the service station or an associated station. Also, the CST may acquire information regarding the date and mileage of the last fluid change by reading a sticker or other record placed on the car. For instance, it is typical for oil change shops to place a sticker on the windshield of the car indicating the last fuel change. Moreover, for other fluids, a sticker or other record may be placed under the hood of the automobile to indicate the last time any of the fluid systems were serviced.

As the vehicle information is being acquired, an automobile service technician (AST), or the customer, opens the hood of the vehicle. Once the AST has access to the components under the hood of the vehicle, the sampling system described above is used to draw fluids from the vehicle. It is preferably to remove those fluids most important to the consumer at the beginning of the process. Specifically, the AST removes the pump 14 from the lid 12, and places the tube 74 directly through the dipstick access hole and into connection with the motor oil reservoir. As the handle 58 is extended from the air chamber 56, motor oil is drawn through the tube, through central channel 60, and into the test tube 64. If a sufficient sample of motor oil is not drawn into the tube 64 after the first stroke, the handle 58 is retracted and extended again. Once a representative sample is located within the tube, the tube is unscrewed and placed into a display device for visual inspection by the consumer. Preferably, the display device used in conjunction with the method is the device disclosed in U.S. Ser. No. 09/770,822 to Sandor Cenziper and Roger Moore filed concurrently in the United States Patent and Trademark Office on Jan. 26, 2001 entitled "Display Device and Method for Marketing Automobile Fluid Replacement Services" and herein incorporated by reference in its entirety.

Once the motor oil is sampled, the AST places the first pump 14 back onto the lid and removes the second pump 16. The tube of the second pump is placed within the transmission fluid reservoir, and transmission fluid is withdrawn in the same manner as the motor oil. Typically, the transmission fluid is accessible by a dipstick access hole. However, in some vehicles, such as some vehicle produced by General Motors, there is not dipstick and the fill hole must be used to sample the transmission fluids.

Next, the second pump 16 is replaced on the lid, and the large syringe 18 is removed. The AST places the end of the large syringe 18 into the coolant reservoir on the side of the car, or, if the car is not hot, into the radiator itself. The bulb 46 of the syringe is depressed to create a vacuum that draws fluid into the bulb as the bulb is released. Then, the bulb is depressed and fluid is discharged into a test tube similar to test tube 64. The process is repeated until a sufficient sample is located within the tube. Along with a visual sample, a pH sample of the coolant may be taken by clipping a small piece of litmus paper on the end of a small rod with an alligator clip and lowering it with the coolant. This is oftentimes necessary since the visual inspection may not indicate a problem with the acidity of the coolant.

Next, the larger syringe 18 is replaced on the bucket, and the smaller syringe 20 is removed. Using a similar process, the smaller syringe is used to sample another fluid, preferably power steering fluid. Also, additional syringes may used to sample other fluids of the automobile. The current process allows the AST to take the fluid samples in less than one minute, a cycle time significantly lower than previously attainable. As described below, this instant information allows the CST to make the consumer aware of the condition of the fluids, and market replacement fluids and services based on the samples.

When the AST has completed these tasks, the actual samples from the vehicle are displayed in side-by-side relation with new, unused fluid samples of the same type. The new samples may be used repeatedly and need not be filled with each successive vehicle. At that time, the CST can explain to the consumer exactly what information is shown by the display device. If the preferred display device is used, the CST can explain what each side of the device means and can explain to the consumer, judging by the visual characteristics of the consumer's vehicle fluids, whether a service is recommended or not. For example, the CST can turn the display device to the side indicating the motor oil fluid system. The CST can visually compare the different visual characteristics of new motor oil versus the consumer's actual motor oil. If the visual characteristics of the fluids are distinct and indicative of contamination of the motor oil of the consumer's vehicle, the customer service technician can recommend the specific service to the consumer, whether a simple fluid change or whether additional services such as a system flush is needed.

If the contamination is not definitive, the CST weighs three factors—the mileage of the vehicle, the interval since the last service on that fluid, and the visual information—to provide a recommendation to the customer. Thus, the information taken at the acquisition stage is used in conjunction with the visual data in a fast, reliable and easily understood manner by using the method and device of the invention.

Once the samples have been shown to the consumer and any service has been ordered, the samples from the consumer's vehicle may be emptied into the bucket through any of the apertures within the lid or by raising the lid and pouring the samples into the bucket. Thus, the sampling device fully integrates the sampling and disposal of each of the fluids in the automobile system. The AST can carry the sampling system from one vehicle to the next without the need for any equipment. The design of the tools allows for removal of fluids shortly after the vehicle engine stops running so that the consumer may have instantaneous automobile information. The depth of the bucket is sufficient to maintain a distance between the tools extending into the bucket and the waste materials held therein.

Using the device and method of the present invention, the consumer is given objective evidence as to whether additional services on his or her vehicle is needed before the consumer exits the service facility. The determination of whether additional services should be performed can be made by the consumer quickly at the time of the initial consultation with the customer service technician. The samples are displayed in the same tubes into which the samples were drawn and not transfer is required.

As can be readily seen, the device and method of the present invention allow for the consumer to make an educated decision as to whether certain vehicle services are needed. The present invention also allows the AST and CST to work together to provide needed services to a consumer who might not otherwise request such services. The visual presentation of system and method is straightforward and simple. Consumers with little or no mechanical experience or knowledge can easily determine for themselves whether services are required. While not all vehicle fluids indicate a need for change simply by visual comparison, the visual condition of most fluids is instructive as to the condition of the fluid and, more importantly, of the system with which the fluid is to be used. In some instances, the visual comparison of the fluids may indicate not only a fluid change, but may indicate that significant repairs should be done to the respective system of the engine. This is both helpful to the technician and to the consumer.

By using the device and method of the present invention, the likelihood of proper vehicle maintenance is increased. Similarly, while not a fundamental purpose of the present invention, sales of fluid change and flush services by a service facility will increase as a result of the educational purpose fulfilled by the present invention to the consumer about the need to maintain and change vehicle fluids. The result is a situation wherein the service facility benefits from increased sales of the its services and the consumer benefits by being provided with information necessary to determine whether vehicle fluids are in need of replacement or vehicle components are in need of service.

Although the invention has been described with reference to the preferred embodiment illustrated in the attached drawing figures, it is notes that substitutions may be made and equivalents employed herein without departing form the scope of the invention as recited in the claims.

What is claimed is:

1. A method of sampling and marketing automobile replacement fluids and services, the method comprising the steps of:

receiving automobile service information;

simultaneously sampling a plurality of automobile fluids, the simultaneous sampling including:

providing a pump having a sampling tube and a first transparent display container releasably secured to said pump;

placing the sampling tube into a dipstick access tube and in communication with a fluid reservoir, and pumping a sample of actual fluid of a first type through the sampling tube and into said first display container;

removing said first transparent container from said pump;

providing a second transparent container with a sample of new fluid of said first type;

comparing said sample of actual fluid of said first type with said sample of new fluid of said first type;

determining whether said first type of fluid in the automobile should be replaced;

placing a syringe within a fluid reservoir containing a second type of automobile fluid; removing a sample of the second type of fluid from the fluid reservoirs; and placing the sample of the second type of fluid into a third transparent display container;

providing a fourth transparent container with a sample of new fluid of the second type; comparing the sample of actual fluid of the second type with the sample of new fluid of the second type; and determining whether the second type of fluid in the automobile should be replaced; and wherein the first and second containers are displayed side-by-side with one another and the third and fourth containers are displayed side-by-side with one another on a common display.

2. The method of claim 1, wherein a bucket is provided, the bucket releasably holding the pump and the syringe, the bucket adapted to receive the actual samples after the determining is complete.

3. The method of claim 1, wherein the second type of fluid is coolant.

4. The method of claim 1, wherein the simultaneous sampling step includes obtaining actual samples of a third type of fluid with a second pump and obtaining samples of a fourth type of fluid with a second syringe.

5. The method of claim 4, further comprising comparing the third and fourth actual samples with new samples of the same types, and determining whether the third and fourth types of fluid in the automobile should be replaced.

* * * * *